US008276993B2

(12) United States Patent
Ripley et al.

(10) Patent No.: US 8,276,993 B2
(45) Date of Patent: Oct. 2, 2012

(54) PARK SYSTEM WITH HIGH/LOW TRIP PRESSURE FOR ADDED FAILURE PROTECTION WITH WORK BRAKE APPLICATION

(75) Inventors: John V. Ripley, Elyria, OH (US); Charles E. Eberling, Wellington, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 1232 days.

(21) Appl. No.: 12/051,481

(22) Filed: Mar. 19, 2008

(65) Prior Publication Data
US 2009/0236904 A1  Sep. 24, 2009

(51) Int. Cl.
*B60T 17/16* (2006.01)
(52) U.S. Cl. .................. 303/5; 303/89; 303/123
(58) Field of Classification Search .............. 303/5, 123, 303/127, 122.15, 89; 701/70; 137/625.49
See application file for complete search history.

(56) References Cited

U.S. PATENT DOCUMENTS

| | | | |
|---|---|---|---|
| 3,294,455 A * | 12/1966 | Valentine | 303/9 |
| 4,018,485 A | 4/1977 | Fannin | |
| 4,088,374 A * | 5/1978 | Gute | 303/9 |
| 4,433,763 A | 2/1984 | Lizzio | |
| 4,844,553 A | 7/1989 | Bliss | |
| 4,907,842 A * | 3/1990 | Goldfein | 303/13 |
| 5,036,961 A | 8/1991 | Eberling et al. | |
| 5,172,958 A * | 12/1992 | Sell | 303/9.76 |
| 5,190,357 A | 3/1993 | Goldfein | |
| 5,226,692 A | 7/1993 | Eberling | |
| 5,335,978 A | 8/1994 | laBastide, Jr. | |
| 5,458,402 A | 10/1995 | Jeffery | |
| 5,558,408 A * | 9/1996 | Naedler et al. | 303/7 |
| 6,234,586 B1 * | 5/2001 | Davis et al. | 303/89 |
| 6,659,244 B2 | 12/2003 | Goodell | |
| 2003/0075973 A1 * | 4/2003 | Soupal | 303/113.1 |
| 2006/0284479 A1 * | 12/2006 | Hoover et al. | 303/89 |
| 2006/0284480 A1 * | 12/2006 | Rudolph et al. | 303/127 |

OTHER PUBLICATIONS

Bendix Service Data Brochure, SD-03-3611, "Bendix PP-1, PP-2, PP-5, PP-8, & RD-3 Push-Pull Type Control Valves", Bendix Commercial Vehicle Systems, LLC, Mar. 2004, pp. 1-4.
Bendix Service Data Brochure, SD-03-2225, "Bendix Double Check Valves", Bendix Commercial Vehicle Systems, LLC, Mar. 2007, pp. 1-4.

(Continued)

*Primary Examiner* — Robert A Siconolfi
*Assistant Examiner* — Anna Momper
(74) *Attorney, Agent, or Firm* — Fay Sharpe LLP

(57) ABSTRACT

A pneumatic brake system for a heavy duty vehicle is provided. The work brake system is operably dependent on a predetermined high trip brake system pressure and a predetermined reset brake system pressure. Upon actuation of the work brake system, when brake system pressure is greater than the predetermined high trip pressure, the work brake system is configured to deliver a pneumatic control signal to the second control valve to activate the service brake assembly. When brake system pressure is less than the predetermined high trip pressure, the work brake system is configured to deliver a pneumatic spring brake signal to the first control valve to activate the spring brake assembly and remove the pneumatic control signal to the second control valve. The delivery of the pneumatic control signal to the second control valve via the work brake system is prevented until brake system pressure exceeds the predetermined reset pressure.

19 Claims, 5 Drawing Sheets

OTHER PUBLICATIONS

Bendix Service Data Brochure, SD-03-4650, "Bendix TR-2, TR-3 & TR-4 Inversion Valves", Bendix Commercial Vehicle Systems, LLC, 2004, pp. 1-4.

Bendix Service Data Brochure, SD-03-4020, "Bendix SV-1 Snychro Valve SV-3 & SV-4 Trailer Release Valve", Bendix Commercial Vehicle Systems, LLC, Oct. 2004, pp. 1-6.

Bendix Service Data Brochure, SD-03-3515, "Bendix RV-3 Pressure Reducing Valve", Bendix Commercial Vehicle Systems, LLC, Mar. 2004, pp. 1-2.

Bendix Service Data Brochure, SD-903-3602, "Bendix TW-1, TW-4, TW-5 & TW-6 Control Valves", Bendix Commercial Vehicle Systems, LLC, Mar. 2004, pp. 1-4.

* cited by examiner

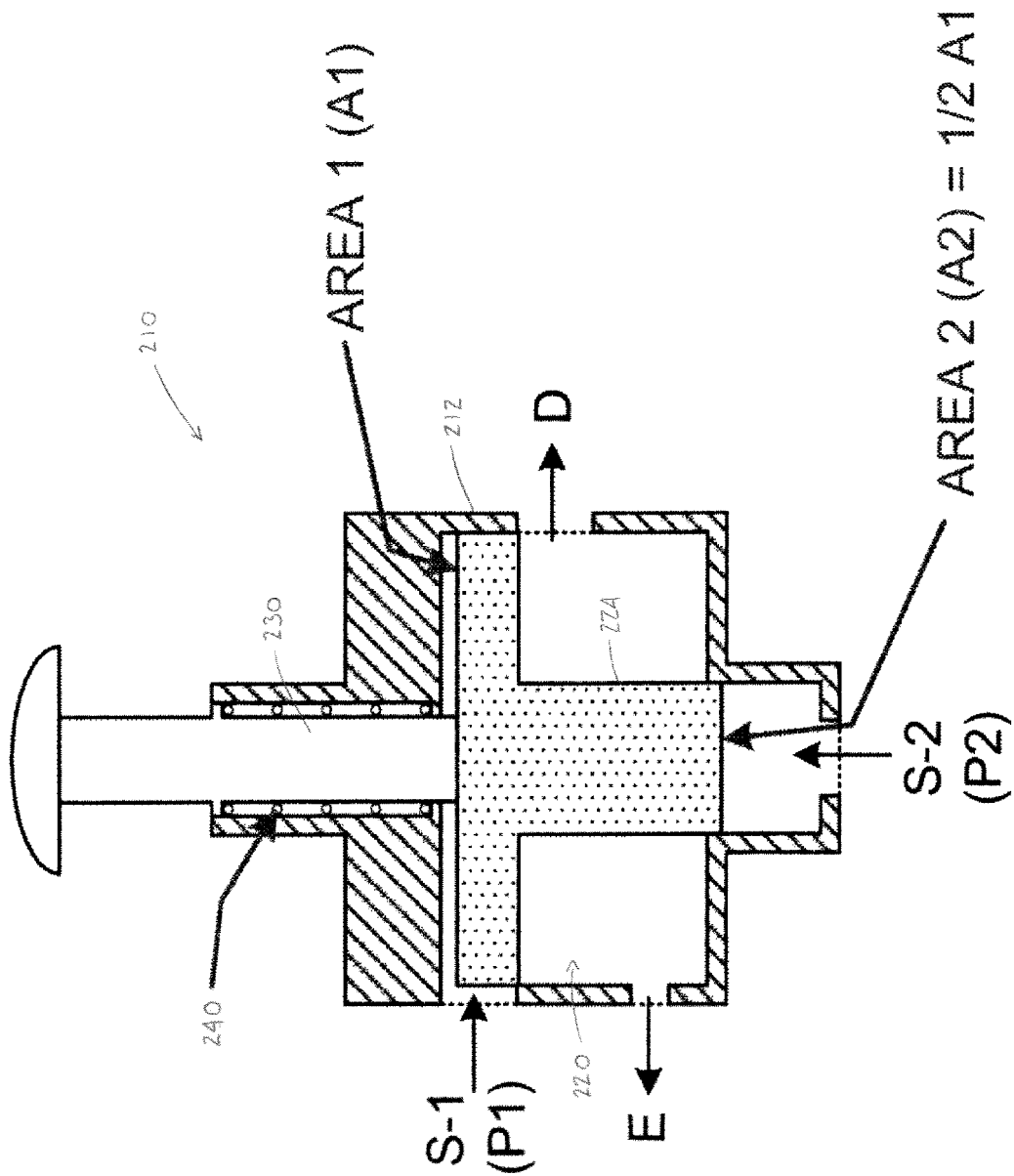

PARK SYSTEM WITH HIGH/LOW TRIP PRESSURE FOR ADDED FAILURE PROTECTION WITH WORK BRAKE APPLICATION

BACKGROUND

The present disclosure generally relates to pneumatic brake systems for heavy duty vehicles that make frequent stops in their vocation.

Pneumatic or air pressure-actuated brake systems for heavy duty vehicles are well known. Such brake systems utilize pressurized air to actuate a brake assembly in a brake chamber of the vehicle. Air actuation of the brake assembly is known in the art as a service brake application and is carried out to slow down or stop the vehicle while it is in motion. In addition to service brakes, it is common for heavy duty vehicles to include spring brakes, which are activated in a parking brake application to lock the brake assemblies in a park position when the vehicle is at rest. The brake assembly is locked in the park position through the expansion force of a spring located within the brake chamber, which is kept compressed in the non-activated state through application of air pressure. Actuation of the spring brakes is effected by venting or exhausting the pressurized air in the lines coupled to the brake chamber, and the spring brakes are deactivated by reintroducing pressurized air into the lines.

Normal operation of certain heavy duty vehicles that make frequent stops in their vocation (i.e., refuse, transit, school transportation and the like) demand frequent parking brake applications in a short period of time, which consume large volumes of compressed air. Such operations result in excessive brake system wear, undesirably reducing the useful life of the brake system components, and resulting in increased vehicle maintenance and repair costs.

It is also well known to provide a work brake system in addition to the conventional spring brakes for parking brake applications during start-and-stop operations of the heavy duty vehicle. Work brake systems generally utilize a service brake application, as if the operator were actuating the service brake pedals, with reduced air pressure from the normal service brake application to hold the vehicle in place. The work brake performs the function of a parking brake, but operates as a reduced pressure service brake.

Although the prior art park systems perform their respective functions, such park systems generally operate in an inefficient manner. Accordingly, there is a need for a park system that would provide a solution to one or more of the deficiencies from which the prior art park systems have suffered.

BRIEF DESCRIPTION

In accordance with one aspect, a pneumatic brake system for a heavy duty vehicle is provided. The heavy duty vehicle has at least one source of pressurized air for pressurizing the brake system, at least one spring brake chamber including a spring brake assembly, and at least one service brake chamber including a service brake assembly. The brake system includes a first control valve, a second control valve and a work brake system. The first control valve is in communication with the source of pressurized air. The first control valve delivers pressurized air to the spring brake chamber and exhausts pressurized air to atmosphere to activate the spring brake assembly when brake system pressure is reduced to a predetermined low trip brake system pressure. The second control valve is in communication with the source of pressurized air and selectively delivers pressurized air to the service brake chamber for application of the service brake assembly. The work brake system is in communication with the source of pressurized air, the first control valve, and the second control valve. The work brake system is operably dependent on a predetermined high trip brake system pressure and a predetermined reset brake system pressure. Upon actuation of the work brake system, when brake system pressure is greater than the predetermined high trip pressure, the work brake system is configured to deliver a pneumatic control signal to the second control valve to activate the service brake assembly. When brake system pressure is less than the predetermined high trip pressure, the work brake system is configured to deliver a pneumatic spring brake signal to the first control valve to activate the spring brake assembly and remove the pneumatic control signal to the second control valve. The delivery of the pneumatic control signal to the second control valve via the work brake system is prevented until brake system pressure is greater than the predetermined reset pressure.

In accordance with another aspect, a pneumatic brake system for a heavy duty vehicle includes a first control valve, a foot control valve and a work brake system. The first control valve has a supply port in communication with a source of pressurized air, a delivery port in communication with a spring brake chamber, and pilot port. The foot control valve is in communication with the source of pressurized air and a service brake chamber. The foot control valve includes a foot pedal/treadle adapted to be selectively actuated by a vehicle operator. The work brake system is in communication with the source of pressurized air, the first control valve and the foot control valve. When the work brake system is disengaged and brake system pressure is reduced to a predetermined low trip pressure, the first control valve exhausts pressurized air to atmosphere to activate the spring brake assembly. When the work brake system is actuated, the work brake system independently actuates the foot control valve when brake system pressure is greater than a predetermined high trip pressure. The work brake system actuates the first control valve to activate the spring brake assembly when brake system pressure is less than a predetermined high trip pressure. The work brake system is inoperable after actuation of the first control valve until brake system pressure is greater than a predetermined reset pressure.

In accordance with still another aspect, a work brake system for a pneumatic brake system of a heavy duty vehicle is provided. The work brake system comprises a control in communication with a source of pressurized air and configured to deliver a pneumatic control signal to a foot control valve. An inversion valve is in communication with the source of pressurized air and configured to monitor brake system pressure. A sequence valve is in communication with the inversion valve and a control valve. When the work brake system is actuated and brake system pressure is greater than a predetermined high trip pressure, the inversion valve operably prevents delivery of a pneumatic spring brake signal to the sequence valve, and the control delivers the pneumatic control signal the foot control valve for application of a service brake assembly. When work brake system pressure is reduced to the predetermined high trip pressure, the inversion valve delivers the pneumatic spring brake signal to the sequence valve, and the sequence valve delivers a pneumatic exhaust signal to the control valve to activate a spring brake assembly. The control valve removes the pneumatic control signal to the foot control valve. The work stop system is inoperable after activation of the spring brake assembly until brake system pressure is greater than a predetermined reset pressure.

Still other aspects of the present disclosure will become apparent from a reading and understanding of the detailed description of the illustrated embodiments hereinbelow.

BRIEF DESCRIPTION OF THE DRAWINGS

FIG. 6 is a schematic of a control valve for the pneumatic brake system of FIG. 5.

DETAILED DESCRIPTION

It should, of course, be understood that the description and drawings herein are merely illustrative and that various modifications and changes can be made to the pneumatic brake system or park system disclosed without departing from the scope of the present disclosure. It will also be appreciated that the various identified components of the pneumatic brake system disclosed herein are merely terms of art that may vary from one manufacturer to another and should not be deemed to limit the present disclosure. Further, details of the identified components of the pneumatic brake system disclosed herein are well known and are commercially available from the assignee of the subject invention so that only selected details will be described herein for purposes of brevity.

Figure 1:
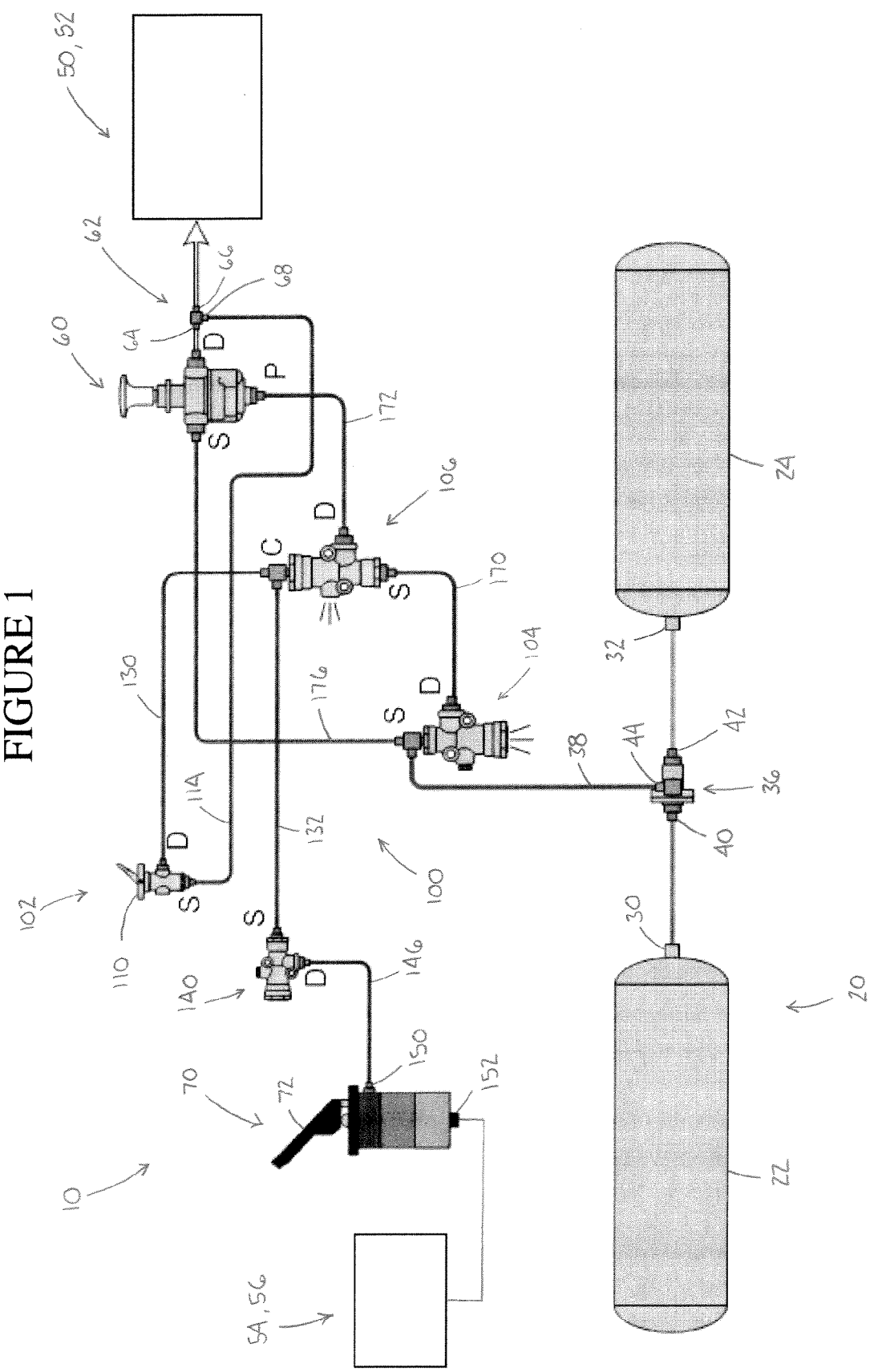
FIGS. 1 and 2 are partial schematic diagrams illustrating pneumatic brake systems for a heavy duty vehicle according to one aspect of the present disclosure.
Figure 2:
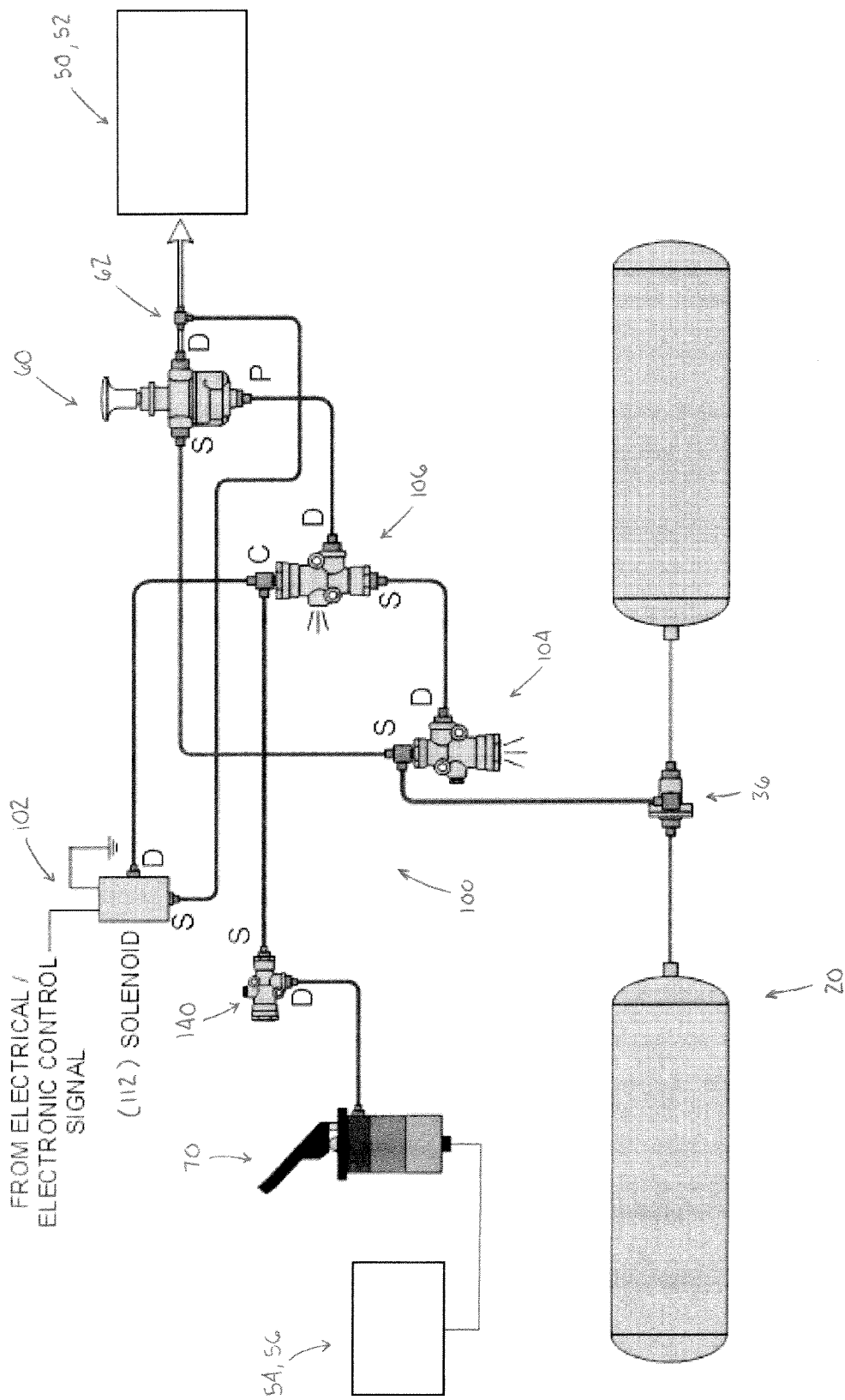

Referring now to the drawings wherein like numerals refer to like parts throughout the several views, FIGS. 1 and 2 partially schematically illustrate a pneumatic park system or brake system according to one aspect of the present disclosure, which is generally indicated by reference numeral 10. The brake system is for use in a heavy duty vehicle (not shown) such as a refuse truck that must make repeated stops with the brakes applied while the operator leaves the cab.

The pneumatic brake system 10 has at least one source of pressurized air 20, for example, in the form of a pair of fluid pressure reservoirs 22 and 24, for pressurizing the brake system. The reservoirs can be charged with fluid pressure by a conventional air compressor (not shown) operated by the engine of the heavy duty vehicle on which the pneumatic brake system 10 is implemented. Delivery ports 30 and 32 of the respective fluid pressure reservoirs 22 and 24 are connected through a double check valve 36. The double check valve is configured to select the higher of the fluid pressure levels at the delivery ports 30, 32. Specifically, the double check valve is used in the pneumatic brake system 10 to direct the flow of pressurized air into a common supply line 38 from either of the fluid reservoirs 22, 24, whichever is at a higher pressure. As air under pressure enters either inlet port 40, 42 of the double check valve, a moving shuttle or disk (not shown) housed within the double check valve responds to the pressure and seals the opposite inlet port, assuming it is at a lower pressure level than the other port. The air flow continues out of a delivery port 44 of the double check valve. The position of the shuttle or disk within the double check valve will reverse if the pressure levels are reversed.

The brake system 10 further includes at least one spring brake chamber 50 including a spring brake assembly 52 in fluid communication with the source of pressurized air 20, and at least one service brake chamber 54 including a service brake assembly 56 in fluid communication with the source of pressurized air 20.

Figure 3:
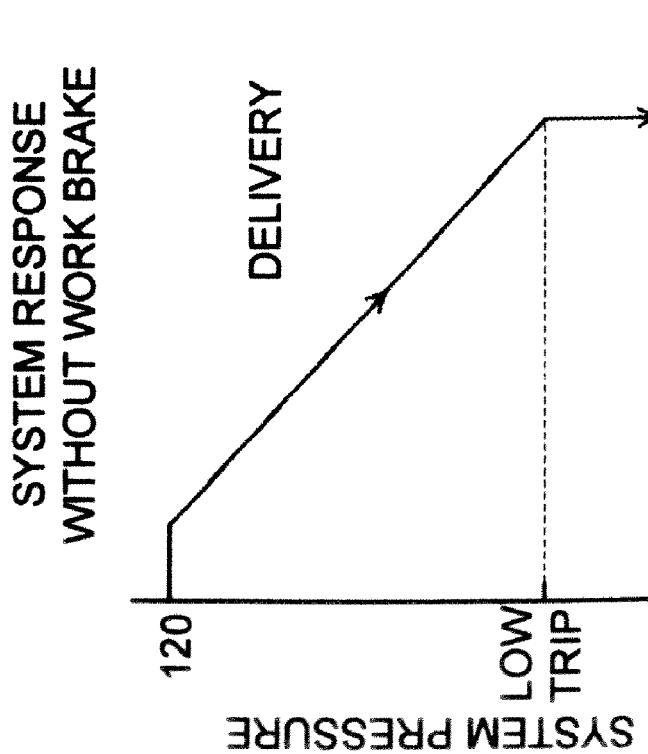

A first control valve 60 is in communication with the source of pressurized air 20 for delivering pressurized air to the spring brake chamber 50 and exhausting pressurized air to atmosphere to activate the spring brake assembly when brake system pressure is reduced to a predetermined low trip brake system pressure (see FIG. 3). As depicted, the first control valve 60 is a push-pull manually operable on-off air control valve with an exhaust function. The first control valve includes at least three ports which are respectively labeled S, D and P. The S port is a source or supply port where air enters the first control valve 60 and the D port is an outlet or discharge port for the first control valve which supplies air pressure therefrom. The P port is a pilot port.

The first control valve 60 is supplied with air pressure from either fluid reservoir 22 or 24 to pressurize the spring brake chamber 50. The first control valve 60 is pressure sensitive so that it can automatically move from an applied position to an exhaust position. In the applied position, the spring brake chamber is pressurized and the spring brake assembly is not activated. As brake supply pressure is reduced to the predetermined low trip pressure, the first control valve moves to the exhaust position, whereby the spring brake assembly is activated. As will be discussed in greater detail below, the first control valve 60, upon receiving a pneumatic signal of a predetermined pressure via the pilot port, will cause the first control valve to move from the applied to the exhaust position from an approximate 100 psi application (see FIG. 4).

A flow diverter 62 is located downstream from the first control valve. The flow diverter includes an inlet 64 in communication with the discharge port D of the first control valve. The flow diverter further includes a first outlet 66 and a second outlet 68, each outlet supplying air pressure therefrom.

A second control valve or foot control valve 70 is in communication with the source of pressurized air 20 for selectively delivering pressurized air to the service brake chamber 54 for application of the service brake assembly. The foot control valve includes a foot pedal/treadle 72 adapted to be selectively actuated by a vehicle operator. When the brake pedal/treadle is depressed, pressurized air is selectively delivered to the service brake chamber. Under selected circumstances as described in the Background, it is desirable to actuate the service brake assembly without depressing the brake pedal/treadle. In accordance with the teachings of the subject disclosure, a work brake system 100 is provided.

Figure 4:
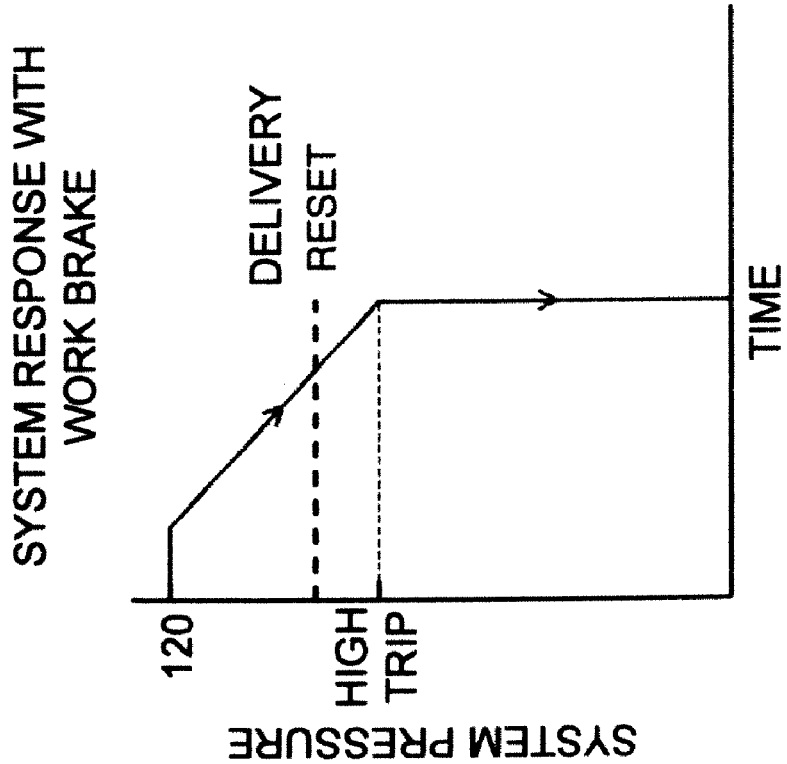
FIGS. 3 and 4 are graphical illustrations of characteristic curves of the pneumatic brake systems of FIGS. 1 and 2.

With reference to FIG. 1, the work brake system 100 is in communication with the source of pressurized air 20, the first control valve 60 and the second control valve 70. As will be discussed in greater detail below, and as shown in FIG. 4, the work brake system is operably dependent on a predetermined high trip brake system pressure and a predetermined reset brake system pressure. Upon actuation of the work brake system, when brake system pressure is greater than the predetermined high trip pressure, the work brake system is configured to deliver a pneumatic control signal to the second control valve 70 to activate the service brake assembly. When brake system pressure is reduced to or less than the predetermined high trip pressure, the work brake system is configured to deliver a pneumatic spring brake signal to the first control valve 60 to activate the spring brake assembly and remove the pneumatic control signal to the second control valve 70. The delivery of the pneumatic control signal to the second control valve 70 via the work brake system 100 after actuation of the first control valve is prevented until brake system pressure is greater than the predetermined reset pressure.

The work brake system 100 comprises a control 102, an inversion valve 104 and a sequence valve 106. The control is typically mounted on the dash of the heavy duty vehicle and is actuated by the operator to apply a work brake to the vehicle to hold the vehicle in place, such as during a temporary stop. As shown in FIG. 1, the control is a manually operated on-off valve 110. As shown in FIG. 2, the control is a solenoid 112. Actuation of the control 102 provides the same effect as if the operator applies the service brake assembly through the foot control valve 70. The control 102 includes at least two ports which are labeled as S and D. The S port is a source or supply port where air enters the control and the D port is an outlet or discharge port for the control which supplies air pressure therefrom. The supply port of the control 102 is in direct communication with the second outlet 68 of the flow diverter 62 via supply line 114, which is continuously pressurized by the air being delivered from the first control valve 60. The control 110 delivers a pneumatic control signal to the second control valve 70. Particularly, with air pressure at the supply port and the control 102 in an exhaust position, the delivery port is open to atmosphere. Upon actuation, supply air is allowed to flow through the delivery port, supply lines 130 and 132 and into a pressure reduction valve 140.

The pressure reduction valve 140 is a normally open pressure control device and includes a supply port S and a delivery port D. The function of the pressure reduction valve is to reduce system air pressure and maintain a constant specified pre-set pressure below that of brake system pressure. The delivery port of the pressure reduction valve 140 is in communication with a control port 150 the second control valve 70. Upon receipt of the reduced pressurized signal via supply line 146 from the pressure reduction valve, the foot control valve 70 applies air pressure to the service brake chamber 54 via a delivery port 152, thus applying the service brake assembly. In this manner, a low capacity pneumatic control signal from the control 102 simulates the same action as the depression of the foot pedal/treadle 72, i.e., actuating or applying pressurized air to the service brake assembly.

The work brake system 100 is provided with fail safe features which automatically divert to spring brake application should a loss of brake system air pressure occur while the heavy duty vehicle is being held by the actuation of the work brake via the control 102. Specifically, the inversion valve 104 monitors brake system pressure being delivered to the control 102 through supply line 38. The inversion valve includes a supply port and a delivery port which are labeled S and D, respectively. The inversion valve 104 is a normally open pilot-operated, inverting, on-off, two way valve. With normal operating pressure at the supply port (i.e., brake system pressure above the predetermined high trip pressure), the delivery port will be exhausted to atmosphere. As brake system pressure is reduced to the predetermined high trip pressure, the inversion valve 104 will deliver full supply pressure to the delivery port. Thus, when brake system pressure is greater than the predetermined high trip pressure, the inversion valve 104 operatively prevents delivery of pressurized air to the sequence valve 106 and the control 102 delivers pressurized air to the foot control valve 70 for application of the service brake assembly. However, when brake system pressure is reduced to the predetermined high trip pressure, the inversion valve 104 delivers a pneumatic spring brake signal to the sequence valve 106, which, in turn, removes the pneumatic control signal to the second control valve 70.

The sequence valve 106 is in communication with the inversion valve 104 and the first control valve 60. The sequence valve includes at least three ports which are labeled as S, D and C. As indicated previously, the S and D ports are the respective supply and delivery ports. The C port is a control port. The supply of air through the sequence valve can only take place when there is no air pressure at the control port. The sequence valve supply port is in communication with the delivery port of the inversion valve 104 via supply line 170. The sequence valve delivery port is in communication with the pilot port P of the first control valve 60 via supply line 172. The control port is fluidly connected to supply lines 130 and 132. A source of pressure acting on the control port C prevents the sequence valve 106 from receiving pressurized air into its supply port S.

When brake system pressure is reduced to the predetermined high trip pressure, the supply port of the inversion valve 104 opens and redirects the pressurized air flowing through supply line 38 into the inversion valve. This, in turn, remove pressurized air flowing into the supply port of the first control valve 60 via supply line 176, which connects the supply ports of the control and inversion valve. The inversion valve then delivers the spring brake signal to the sequence valve 106. Because pressurized air was redirected by the inversion valve 104, no pressurized air is acting on the control port of the sequence valve 106. Thus, the pressurized air being delivered by the inversion valve 104 flows into the supply port of the sequence valve 106. The sequence valve, in turn, delivers a pneumatic exhaust signal to the first control valve 60. The first control valve, in response to the pneumatic exhaust signal, exhausts the spring brake chamber 50 to activate the spring brake assembly. By exhausting the spring brake chamber, the delivery of pressurized air to the flow diverter 62 is stopped, which, in turn, stops the delivery of pressurized air to the control 102. Thus, in response from the respective pneumatic signals of the inversion valve 104 and the sequence valve 106, the first control valve 60 actuates the spring brake assembly. The work stop system 100 is inoperable after activation of the spring brake assembly until brake system pressure is greater than the predetermined reset pressure.

With reference to FIGS. 3 and 4, the brake system 10 is graphically illustrated. As shown in FIG. 3, when the work brake system 100 is disengaged, the brake system includes the predetermined low trip pressure. Pressurized air is continuously delivered to the first control valve 60 via supply lines 38 and 176. The first control valve 60 delivers pressurized air through the diverter valve 62 to the spring brake chamber 50. If brake system pressure is reduced to the predetermined low trip pressure, the first control valve 60 exhausts the pressurized air to atmosphere thereby activating the spring brake assembly.

As shown in FIG. 4, when the work brake system 100 is engaged, the operation of the brake system 10 is dependent on the predetermined high trip pressure and the predetermined reset pressure, which is greater than the high trip pressure. As indicated previously, upon activation of the work brake system, a portion of the pressurized air being delivered to the spring brake chamber 50 via the first control valve 60 is directed into the supply port of the control 102, which, in turn, reduces pressure being delivered to the spring brake chamber. The control 102 delivers the pneumatic signal to the foot control valve 70, which, in turn, supplies pressurized air to the service brake chamber 54 to activate the service brake assembly 56. Pressurized air is also being continuously delivered to the first control valve 60 to maintain pressure within the spring brake chamber 50. The inversion valve 104 continuously monitors the brake system pressure. If brake system pressure is reduced to the predetermined high trip pressure, the inversion valve 104 sends the spring brake signal to the sequence valve 106, and the sequence valve sends the exhaust signal to the first control valve 60. In response to the exhaust signal, the first control valve activates the spring brake assembly. Activation of the spring brake assembly completely removes pressurized air to the control 102 thereby completely disabling the work brake system 100. After activation of the spring brake assembly, the work brake system 100 cannot be actuated until the brake system pressure is above the predetermined reset pressure. Once the brake system pressure is greater than the predetermined reset pressure, the work brake system 100 can again be activated by the control 102.

Figure 5:
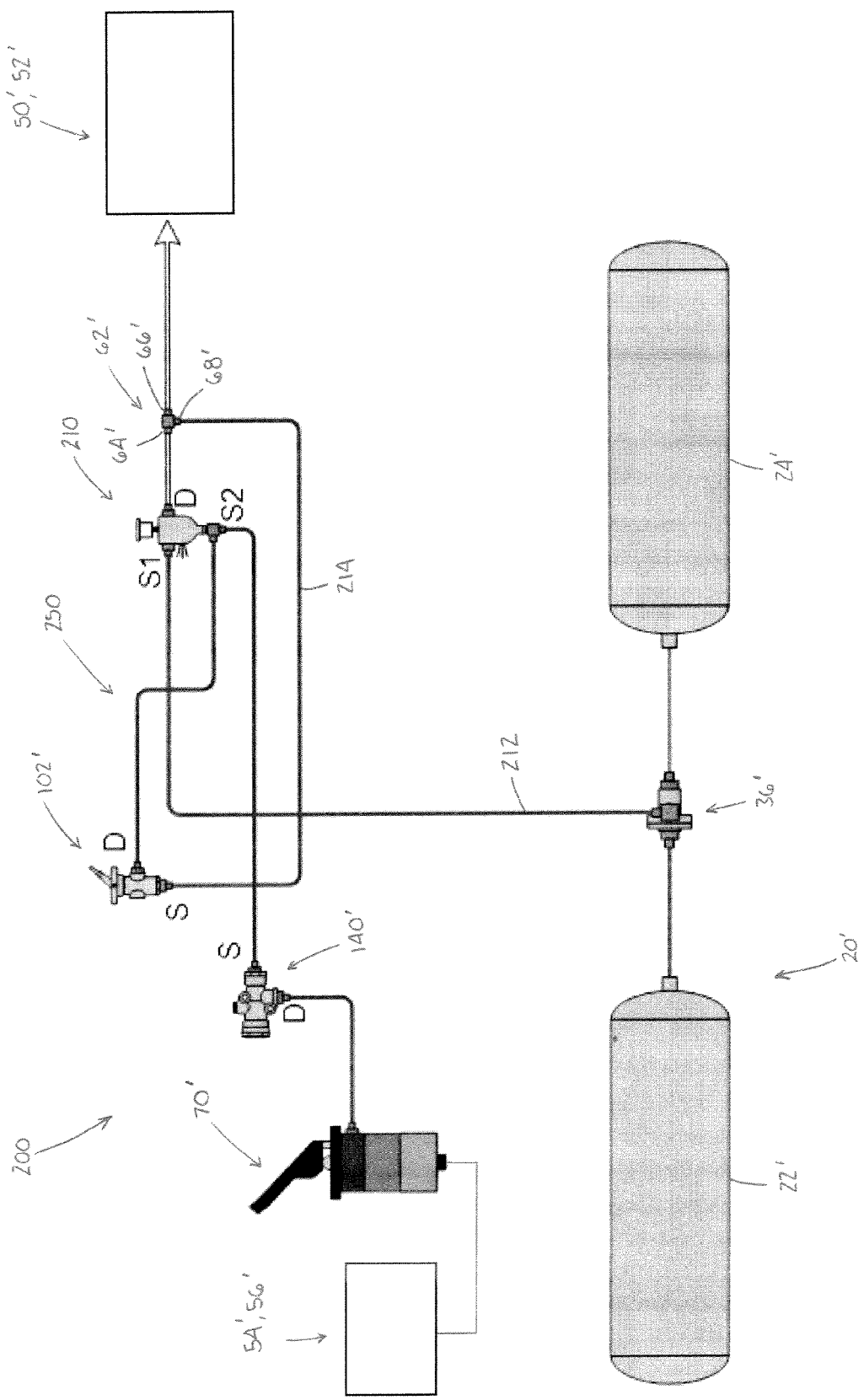
FIG. 5 is a partial schematic diagram illustrating a pneumatic brake system for a heavy duty vehicle according to another aspect of the present disclosure.

Similar to the aforementioned embodiment, an additional embodiment of a pneumatic brake system is shown in FIGS. 5 and 6. Since most of the structure and function is substantially identical, reference numerals with a single primed suffix (') refer to like components (e.g., second control valve or foot control valve 70 is referred to by reference numeral 70'), and new numerals identify new components.

With reference to FIG. 5, a pneumatic brake system 200 has at least one source of pressurized air 20', for example, in the form of a pair of fluid pressure reservoirs 22' and 24', for pressurizing the brake system. The fluid pressure reservoirs are connected through a double check valve 36'. A first control valve 210 is in communication with the source of pressurized air for delivering pressurized air to a spring brake chamber 50' and exhausting pressurized air to atmosphere to activate a spring brake assembly 52' when brake system pressure is reduced to a predetermined low trip brake system pressure. A second control valve 70', which is adapted to be selectively actuated by a vehicle operator, is in communication with the source of pressurized air for selectively delivering pressurized air to a service brake chamber 54' for application of a service brake assembly 56'. When the second control valve is actuated, pressurized air is selectively delivered to the service brake chamber.

The pneumatic brake system 200 comprises a work brake system 250 to independently actuate the service brake assembly without activating the second control valve 70'. Similar to the previous embodiment, the work brake system is operably dependent on a predetermined high trip brake system pressure and a predetermined reset brake system pressure, which is greater than the high trip brake pressure. The work brake system includes a control 102', a pressure reduction valve 140' and the first control valve 210.

The first control valve 210 includes a valve body 212 having supply port S-1, a delivery port D, a pilot port S-2, and an exhaust port E adapted to communicate with atmosphere. The supply port S-1 is in direct communication with the source of pressurized air 20' via supply line 212. A flow diverter 62' is located downstream from the first control valve. The flow diverter includes an inlet 64' in communication with the delivery port, a first outlet 66' and a second outlet 68'.

The control 102' includes a source or supply port S where air enters the control and an outlet or discharge port D which delivers a pneumatic control signal to the second control valve 70'. The supply port of the control 102' is in direct communication with the second outlet of the flow diverter via supply line 214, which is continuously pressurized by the air being delivered from the first control valve 210.

With reference to FIG. 6, housed within a valve chamber 220 defined by the valve body is a valve member 224. The valve chamber has a predetermined fixed area, and the valve member is configured to divide the valve chamber area into a first area A1 and a second area A2. A button or plunger 230 is operably connected to the valve member and extends outwardly from the valve body. A portion of the plunger is circumscribed by a spring 240. The first control valve 210 is pressure sensitive so that the valve member 224 is reciprocally movable within the valve chamber 220 from an applied position (not shown), whereby the valve member seals off the exhaust port E and pressurized air is delivered to the spring brake chamber, to the illustrated exhaust position, whereby the valve member seals off the supply port S-1 and pressurized air is exhausted from the spring brake chamber. In both the applied position, the exhaust position and any position of the valve member therebetween, a constant area ratio (defined by the first and second areas A1 and A2) is maintained by the movement of the valve member. In the depicted embodiment, the second area A2 is approximately equal to one-half (½) the first area; although, alternative area ratios are contemplated.

In use, if there is no pressure (P2) applied to the pilot port S-2, the first control valve will remain in the applied position if the pressure (P1) applied to the supply port S-1 multiplied by the first area A1 (P1*A1) is greater than or equal to the force of the spring 240. Upon activation of the work brake system 250, when common pressure is applied to the both supply port S-1 and the pilot port S-2 (i.e., P1 is approximately equal to P2), the combined force of the spring and the pressure acting on the second area A2 (spring force+(P2*A2)) increases the force (P1*A1) required to maintain the first control valve 210 in the applied position. The first control valve 210 will move to the exhaust position when spring force+(P2*A2) is greater than or approximately equal to (P1*A1).

When the work brake system 250 is disengaged, pressurized air is continuously delivered to the supply port S-1 of the first control valve 210. The first control valve, in turn, delivers pressurized air to a spring brake chamber via the first outlet 66' of the flow diverter 62'. If brake system pressure is reduced to a predetermined low trip pressure, the first control valve 210 exhausts the pressurized air to atmosphere thereby activating the spring brake assembly. For example, if the spring force is equal to forty pounds (40 lbs), the first area A1 is equal to one square inch (1 in$^2$) and the second area A2 is one-half the first area (0.5 in$^2$), with no pressurized air acting on the pilot port S-2, the first control valve 210 will exhaust at forty pounds per square inch (40 psi) (i.e., when the spring force≧ (P1*A1)).

Upon activation of the work brake system 250, the control 102' is activated and the pressurized air located in supply line 214 flows into the supply port of the control. Particularly, a portion of the pressurized air being delivered by the first control valve 210 to the spring brake chamber is redirected by the diverter valve and enters the control 102' via its supply port S. The control 102' delivers a pneumatic control signal via its outlet port D, past the pilot port S-2 of the first control valve 210 and to the second control valve 70', which, in turn, supplies pressurized air to the service brake chamber to activate a service brake assembly. Thus, pressurized air is being applied to the pilot port S-2. Pressurized air is also being continuously delivered to supply port S-1 of the first control valve 210 to maintain pressure within the spring brake chamber. In this embodiment, the first control valve performs the same functions as the control valve 60, inversion valve 104 and sequence valve 106 of the previous embodiment. The first control valve 210 monitors brake system pressure. If brake system pressure is reduced to a predetermined high trip pressure, the first control valve 210 activates the spring brake assembly by exhausting pressurized air to atmosphere. For example, if the pressure P1 being applied to the supply port S-1 is reduced such that the pressure P1 is approximately equal to the pressure P2 (i.e., the pneumatic control signal) being applied to the pilot port S-2 via the control 102', the first control valve 210 will exhaust at eighty pounds per square inch (80 psi) (i.e., when (spring force+(P2*A2))≧(P1*A1)). With no pressurized air being delivered by the first control valve 210, the pressurized air flowing to the control 102' is stopped, which completely disables the work brake system 250. The work brake system 250 cannot be actuated until the brake system pressure is above the predetermined reset pressure. Once the brake system pressure is greater than the predetermined reset pressure, the work brake system can again be activated by the control 102'.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A pneumatic brake system for a heavy duty vehicle having at least one source of pressurized air for pressurizing the brake system, at least one spring brake chamber including a spring brake assembly and at least one service brake chamber including a service brake assembly, the pneumatic brake system comprising:
 a first control valve in communication with the source of pressurized air for delivering pressurized air to the spring brake chamber and exhausting pressurized air to atmosphere to activate the spring brake assembly when work brake system pressure is reduced to a predetermined low trip brake system pressure;
 a second control valve in communication with the source of pressurized air for selectively delivering pressurized air to the service brake chamber for application of the service brake assembly; and
 a work brake system in communication with the source of pressurized air, the first control valve, and the second control valve, the work brake system being operably dependent on a predetermined high trip brake system pressure and a predetermined reset brake system pressure,
 wherein upon actuation of the work brake system, when work brake system pressure is greater than the predetermined high trip pressure, the work brake system is configured to deliver a pneumatic control signal to the second control valve to activate the service brake assembly,
 wherein when the work brake system pressure is reduced to the predetermined high trip pressure, the work brake system is configured to deliver a pneumatic spring brake signal to the first control valve to activate the spring brake assembly and remove the pneumatic control signal to the second control valve,
 wherein the delivery of the pneumatic control signal to the second control valve via the work brake system is prevented until work brake system pressure is greater than the predetermined reset pressure,
 wherein the predetermined reset pressure is greater than the predetermined high trip pressure;
 wherein the work brake system includes a control for delivering the pneumatic control signal to the second control valve, the control being remote from the second control valve; and
 wherein the work brake system includes an inversion valve for monitoring work brake system pressure, and a sequence valve in communication with the inversion valve and the first control valve, wherein when work brake system pressure is greater than the predetermined high trip pressure the inversion valve is configured to prevent the delivery of the pneumatic spring brake signal to the sequence valve.

2. The pneumatic brake system of claim 1, wherein the first control valve is a manually operable control valve configured to monitor work brake system pressure, the first control valve including:
 a valve body defining a valve chamber having a fixed area;
 a valve member moveably housed within the valve chamber between an applied position and an exhaust position, the valve member separating the fixed area into a first area and a second area, the first and second areas defining an area ratio which remains generally constant as the valve member moves within the valve chamber.

3. The pneumatic brake system of claim 2, wherein the second area is approximately equal to one-half the first area.

4. The pneumatic brake system of claim 1, wherein the second control valve includes a foot control valve adapted to be selectively actuated by a vehicle operator.

5. The pneumatic brake system of claim 1, wherein when brake system pressure is less than the predetermined high trip pressure, the inversion valve is configured to deliver the spring brake signal to the sequence valve, the sequence valve delivering a pneumatic exhaust signal to the first control valve.

6. The pneumatic brake system of claim 1, wherein the first control valve includes a supply port in communication with the source of pressurized air and a delivery port for delivering pressurized air to the spring brake chamber, and the control includes a supply port in communication with the delivery port of the first control valve and a delivery port for delivering the pneumatic control signal,
 wherein activation of the spring brake assembly removes pressurized air to the supply port of the control thereby disabling the work brake system.

7. A pneumatic brake system for a heavy duty vehicle having at least one source of pressurized air for pressurizing the work brake system, at least one spring brake chamber including a spring brake assembly and at least one service brake chamber including a service brake assembly, the pneumatic brake system comprising:
 a first control valve having a supply port in communication with the source of pressurized air, a delivery port in communication with the spring brake chamber and a pilot port;
 a foot control valve in communication with the source of pressurized air and the service brake chamber, the foot control valve assembly including a foot pedal/treadle adapted to be selectively actuated by a vehicle operator; and
 a work brake system in communication with the source of pressurized air, the first control valve and the foot control valve;
 wherein, when the work brake system is disengaged and work brake system pressure is reduced to a predetermined low trip pressure, the first control valve exhausts pressurized air to atmosphere to activate the spring brake assembly,
 wherein, when the work brake system is actuated and work brake system pressure is greater than a predetermined high trip pressure, the work brake system independently actuates the foot control valve,
 wherein when work brake system pressure is less than the predetermined high trip pressure, the work brake system actuates the first control valve to activate the spring brake assembly, and wherein the work brake system is inoperable after actuation of the first control valve until work brake system pressure is greater than a predetermined reset pressure.

8. The pneumatic brake system of claim 7, wherein the predetermined reset pressure is greater than the predetermined high trip pressure.

9. The pneumatic brake system of claim 7, wherein the work brake system is remote from the foot control valve and includes:
    a control for delivering a pneumatic control signal to the foot control valve,
    an inversion valve for monitoring work brake system pressure and delivering a pneumatic spring brake signal, and
    a sequence valve in communication with the inversion valve and the first control valve,
    wherein when work brake system pressure is greater than the predetermined high trip pressure the inversion valve is configured to prevent delivery of the pneumatic spring brake signal to the sequence valve,
    wherein when work brake system pressure is less than the predetermined high trip pressure the inversion valve delivers the pneumatic spring brake signal to the sequence valve, the sequence valve being configured to deliver a pneumatic exhaust signal to the first control valve, and
    wherein the first control valve, in response to the pneumatic exhaust signal, exhausts pressurized air to atmosphere to activate the spring brake assembly, the pneumatic control signal from the control to the foot control valve being removed.

10. The pneumatic brake system of claim 9, wherein the control includes a supply port in direct communication with the delivery port of the first control valve and a delivery port for delivering the pneumatic control signal,
    wherein activation of the control reduces pressure being delivered to the spring brake chamber, and
    wherein activation of the spring brake assembly disables the work brake system.

11. The pneumatic brake system of claim 7, wherein the first control valve includes:
    a valve body defining a valve chamber having a fixed area;
    a valve member moveably housed within the valve chamber between an applied position and an exhaust position, the valve member separating the fixed area into a first area and a second area, the first and second areas defining an area ratio which remains generally constant as the valve member moves within the valve chamber.

12. The pneumatic brake system of claim 11, wherein the second area is approximately equal to one-half the first area.

13. The pneumatic brake system of claim 11, wherein the work brake system includes a control having a supply port in communication with the source of pressurized air and a delivery port for delivering a pneumatic control signal to the foot control valve,
    wherein the delivery port of the first control valve is in communication with the supply port of the control such that activation of the control reduces pressure being delivered by the first control valve to the spring brake chamber, and
    wherein the pilot port of the first control valve flow is in communication with the delivery port of the control, the pneumatic control signal being applied to the pilot port as the pneumatic control signal is being delivered to the foot control valve.

14. The pneumatic brake system of claim 13, wherein when pressure being applied to the supply port of the first control valve is approximately equal to the pneumatic control signal being applied to the pilot port of the first control valve, the first control valve is configured to exhaust pressurized air to atmosphere to activate the spring brake assembly.

15. The pneumatic brake system of claim 11, wherein the work brake system includes a control having a supply port in direct communication with the delivery port of the first control valve and a delivery port for delivering a pneumatic control signal to the foot control valve,
    wherein the supply port of the first control valve is in direct communication with the source of pressurized air,
    wherein actuation of the control directs a portion of the air being delivered to the spring brake chamber via the delivery port of the first control valve to the supply port of the control.

16. A work brake system for a pneumatic brake system of a heavy duty vehicle, the work brake system including:
    a source of pressurized air for pressurizing the work brake system,
    at least one spring brake chamber including a spring brake assembly,
    at least one service brake chamber including a service brake assembly,
    a control valve in communication with the source of pressurized air for delivering pressurized air to the spring brake chamber and exhausting pressurized air to atmosphere to activate the spring brake assembly when brake system pressure is reduced to a predetermined low trip pressure, and
    a foot control valve in communication with the source of pressurized air and the service brake chamber, the foot control valve assembly including a foot pedal/treadle adapted to be selectively actuated by a vehicle operator, the foot control valve delivering pressurized air to the service brake chamber for application of the service brake assembly,
    the work brake system comprising:
    a control in communication with the source of pressurized air and configured to deliver a pneumatic control signal to the foot control valve,
    an inversion valve in communication with the source of pressurized air and configured to monitor work brake system pressure, and
    a sequence valve in communication with the inversion valve and the control valve,
    wherein, when the work brake system is actuated and work brake system pressure is greater than a predetermined high trip pressure, the inversion valve operably prevents delivery of a pneumatic spring brake signal to the sequence valve, and the control delivers the pneumatic control signal the foot control valve for application of the service brake assembly,
    wherein when work brake system pressure is reduced to the predetermined high trip pressure, the inversion valve delivers the pneumatic spring brake signal to the sequence valve, the sequence valve delivering a pneumatic exhaust signal to the control valve to activate the spring brake assembly, the control valve removing the pneumatic control signal to the foot control valve,
    wherein the work stop system is inoperable after activation of the spring brake assembly until work brake system pressure is greater than a predetermined reset pressure,
    wherein the predetermined reset pressure is greater than the predetermined high trip pressure.

17. The work brake system of claim 16, further including a flow diverter located downstream of the control valve, the flow diverter having an inlet in communication with the control valve, a first outlet in communication with the spring brake chamber and a second outlet in communication with the control,
- wherein actuation of the control directs a portion of the pressurized air being delivered to the spring brake chamber via the control valve to the control,
- wherein activation of the spring brake assembly completely removes pressurized air to the control thereby disabling the work brake system.

18. The work brake system of claim 16, further including a pressure reduction valve in communication with the control and the foot control valve.

19. The work brake system of claim 16, wherein the control includes at least one of a lever operated control valve and a solenoid.

* * * * *